UNITED STATES PATENT OFFICE.

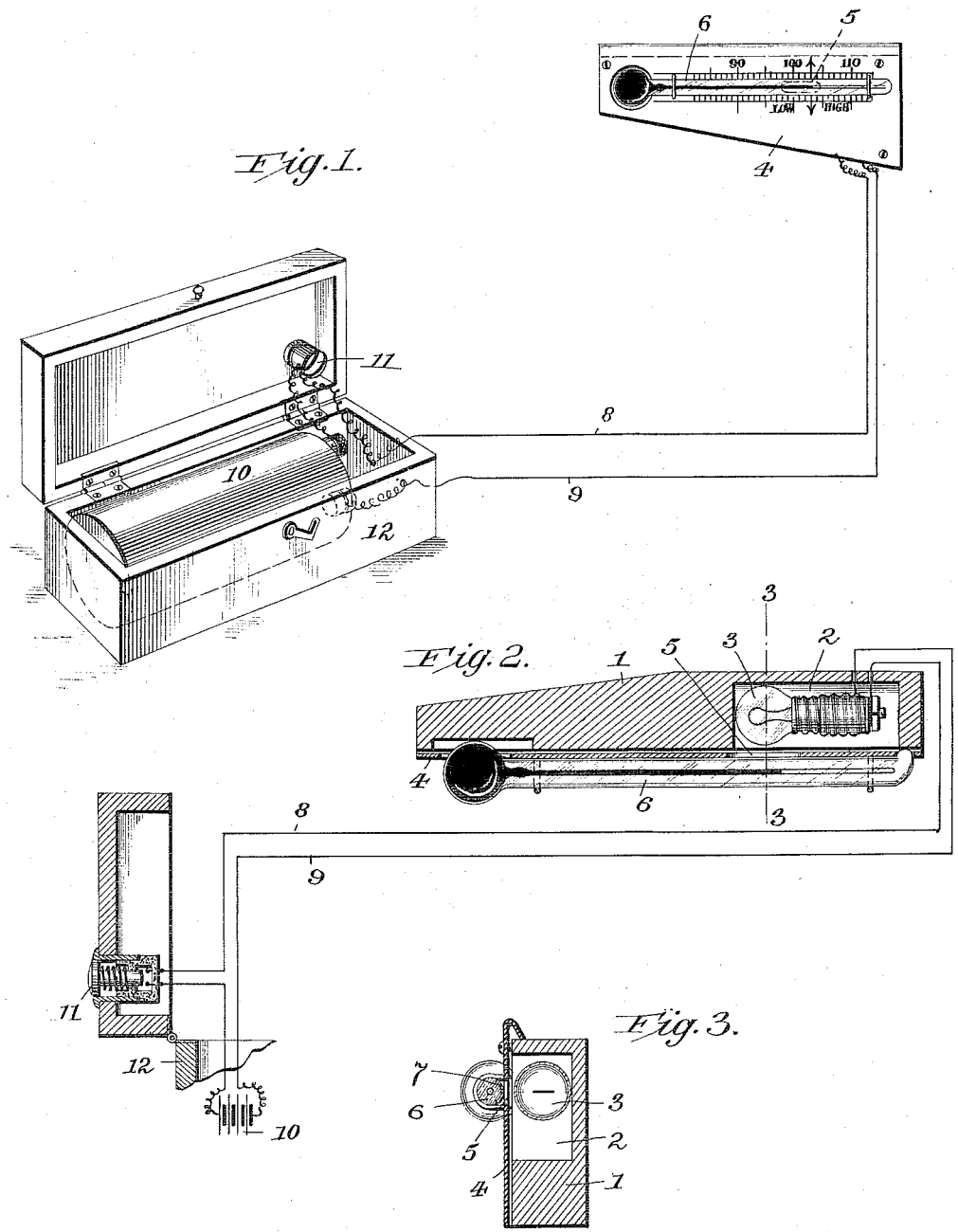

WILLIAM F. GURLEY, OF TROY, NEW YORK, ASSIGNOR TO W. & L. E. GURLEY, A CORPORATION OF NEW YORK.

ILLUMINATING DEVICE.

1,005,829.  Specification of Letters Patent.  Patented Oct. 17, 1911.

Application filed August 6, 1909. Serial No. 511,625.

*To all whom it may concern:*

Be it known that I, WILLIAM F. GURLEY, a citizen of the United States, residing at Troy, in the county of Rensselaer and State of New York, have invented certain new and useful Improvements in Illuminating Devices, of which the following is a specification.

This invention relates to a combination by which a surface or surfaces bearing or constituting marks or matter to be read may be illuminated by rays of light falling upon a light diffusing member associated with the surface to be illuminated, the rays of light coming from behind and through an aperture in the body having the surface to be illuminated.

I have applied my invention to thermometers, but it is equally applicable to barometers and other indicating or display devices, such as signs, etc.

I have found that the part that may be most conveniently used as the reflecting member is a glass or tube having a rounded or prismatic shape in cross section, such as the tube of a thermometer or barometer, but other forms of diffusing member may be used. The tube or equivalent diffusing member is placed opposite an opening in the surface to be illuminated and slightly in front of that surface, and the material of the tube acts to diffuse or reflect the rays of light falling upon it from the source of illumination behind the surface so that such reflected or diffused rays will illuminate the surface. At the same time, in the case of such devices as thermometers or barometers, the direct illumination which the tube receives enables the position of the opaque or colored fluid column therein to be instantly seen, and its position with respect to the markings of the scale noted.

The accompanying drawings illustrate various embodiments of my invention as applied to a thermometer, it being understood that these are merely illustrative of some of the uses to which the invention may be put.

In the particular form of embodiment of my invention illustrated in the accompanying drawings, I provide means whereby the light may be caused to glow so as to fall upon the thermometer tube only for such a length of time as may be desired in order to permit the scale and the height of the mercury to be read, the construction being especially applicable for use in conjunction with incubators, wherein it is necessary that the temperature in the interior of the incubator should be frequently noted in order that it may be regulated so as to be kept approximately at a predetermined point, and furthermore, that there shall be no constant light within the incubator. But it is to be understood that, while the invention is especially adapted to be employed in conjunction with incubator thermometers, it is not limited thereto nor even to thermometers, as it is capable of much more general application.

In the drawings of which Figure 1 is a perspective view of the apparatus as a whole, the cell-containing box being shown as open; Fig. 2 a sectional, diagrammatic view; and Fig. 3 a transverse sectional view, taken on the line 3—3 of Fig. 2, 1 denotes a support provided with a chamber 2, in which is mounted a small electric lamp 3. Secured to the forward face of the supporting member 1 is a plate 4 having the requisite graduations thereon, as clearly indicated in Fig. 1, and with an opening 5 formed therein in line with the lamp 3. If the thermometer is to be kept within close limits, as in an incubator, this opening will be relatively short, but it is to be understood that it may be made substantially coextensive with the tube, and the scale and tube thus illuminated throughout their length.

The tube 6 is secured to the face plate 4, and will preferably be formed with a white semi-opaque of translucent backing 7, Fig. 3, which, when the light is caused to burn, acts as a reflecting surface and illuminates the scale, thereby bringing the graduations or markings thereon clearly into view. At the same time, the tube is likewise illuminated and the mercury or other liquid column caused to stand out in sharp contrast therewith, so that it is a matter of ease to read the thermometer, and it is necessary to maintain the light for a short period only.

In case the thermometer is located in a chamber or receptacle, as for instance, an incubator, which should not be opened, wires 8 and 9 lead therefrom to a point outside of the structure, and include in the circuit a dry-cell or source of energy, 10, and a push-button 11. Preferably, the battery and the push-button will be located in a box, as 12, which may be placed at any convenient point upon the outside of the casing or incubator.

I have found that it is most convenient to use an electric lamp as the illuminant and to closely associate it with the thermometer and scale, but other sources of illumination may, of course, be used and the source, whatever it may be, may be placed at a distance from the device to be illuminated, the only essential thing in this connection being that the light rays from the source shall be brought to the rear of the tube.

Having described my invention, what I claim is:

1. In combination with a body having a surface to be illuminated, said body having a light transmitting aperture therein, a light diffusing member covering said aperture and located in advance of the surface to be illuminated, a measuring instrument adapted to be read in conjunction with said illuminated surface and likewise located in advance of such surface, and a source of illumination adapted to cast light rays upon the light diffusing member from the rear of the surface to be illuminated.

2. In an illuminated indicating device, the combination of two associated members to be illuminated, one having an opening and the other being translucent and located in front of the one first named in line with the opening therein, said translucent member being adapted to reflect upon the other member light-rays falling upon said translucent member from the rear; a support for said members; and a source of light carried by said support and located in rear of the opening and the members aforesaid.

3. In combination with a thermometer-tube; a support therefor having an opening therein; a scale on the forward face of the support adjacent to and in rear of the tube; and a source of light directing light rays through the opening in said support and on the rear of the tube, whereby the tube and scale will be illuminated.

4. In combination with a thermometer-tube having an opaque backing; a support therefor having an opening therein at the rear of the tube; a scale at the forward face of the support; an electric lamp adapted to throw light upon the backing of the tube; and means for energizing the lamp, whereby the tube and scale will be illuminated by light-rays reflected from the opaque backing.

5. In combination with a supporting member having a series of graduations thereon; an indicating tube mounted upon said support in proper relation to the graduations; a white, opaque surface carried by the tube next to the supporting member in line with an opening formed therein in rear of the tube; a source of energy in open circuit with said lamp; and a switch for closing said circuit.

In testimony whereof I have signed my name to this specification in the presence of two subscribing witnesses.

WILLIAM F. GURLEY.

Witnesses:
WARREN G. CLARK,
FRANK SHRAUDER.